(12) United States Patent
Wang et al.

(10) Patent No.: US 7,885,465 B2
(45) Date of Patent: *Feb. 8, 2011

(54) DOCUMENT PORTION IDENTIFICATION BY FAST IMAGE MAPPING

(75) Inventors: Jian Wang, Beijing (CN); Yingnong Dang, Beijing (CN); Qiang Wang, Beijing (CN); Liyong Chen, Beijing (CN); Xiaoxu Ma, Cambridge, MA (US)

(73) Assignee: Microsoft Corporation

( * ) Notice: Subject to any disclaimer, the term of this patent is extended or adjusted under 35 U.S.C. 154(b) by 41 days.

This patent is subject to a terminal disclaimer.

(21) Appl. No.: 12/211,473

(22) Filed: Sep. 16, 2008

(65) Prior Publication Data

US 2009/0016614 A1     Jan. 15, 2009

Related U.S. Application Data

(63) Continuation of application No. 10/752,086, filed on Jan. 7, 2004, now Pat. No. 7,463,774.

(51) Int. Cl.
*G06K 9/68* (2006.01)
*G06K 9/62* (2006.01)
*G06K 19/06* (2006.01)
*G06F 3/033* (2006.01)

(52) U.S. Cl. ............... 382/218; 382/216; 235/494; 345/179

(58) Field of Classification Search .......... 382/218
See application file for complete search history.

(56) References Cited

U.S. PATENT DOCUMENTS

| | | | |
|---|---|---|---|
| 5,442,147 A * | 8/1995 | Burns et al. | 178/18.09 |
| 5,661,506 A * | 8/1997 | Lazzouni et al. | 345/179 |
| 5,852,434 A * | 12/1998 | Sekendur | 345/179 |
| 6,131,807 A * | 10/2000 | Fukuda et al. | 235/494 |
| 6,176,427 B1 | 1/2001 | Antognini et al. | |
| 6,178,539 B1 | 1/2001 | Papadopoulou et al. | |
| 6,182,901 B1 | 2/2001 | Hecht et al. | |
| 6,186,405 B1 * | 2/2001 | Yoshioka | 235/494 |
| 6,219,460 B1 | 4/2001 | Tatsuta | |
| 6,279,830 B1 * | 8/2001 | Ishibashi | 235/494 |
| 6,302,329 B1 * | 10/2001 | Iwai et al. | 235/494 |
| 6,351,556 B1 * | 2/2002 | Loui et al. | 382/164 |
| 6,502,756 B1 * | 1/2003 | Fåhraeus | 235/494 |
| 6,548,768 B1 * | 4/2003 | Pettersson et al. | 178/18.01 |

(Continued)

FOREIGN PATENT DOCUMENTS

EP     0 764 944     3/1997

*Primary Examiner*—David P Rashid
(74) *Attorney, Agent, or Firm*—Lee & Hayes, PLLC (57) ABSTRACT

An efficient technique is provided for determining a portion of a document corresponding to a captured image. Areas of a document in which the pattern is at least partially obscured are identified. A reference pixel in the image is selected, and an offset between the pixel and the pattern is determined. A pixel-by-pixel comparison is then made of the image with the document such that the reference pixel is only compared with locations in the document that are both within the identified areas and have the determined offset from the pattern. The comparison with the highest correspondence between the image pixels and the electronic document then identifies the position of the reference pixel relative to the electronic document.

20 Claims, 10 Drawing Sheets

U.S. PATENT DOCUMENTS

| | | |
|---|---|---|
| 6,606,421 B1 | 8/2003 | Shaked et al. |
| 6,622,923 B1 * | 9/2003 | Walmsley et al. ............ 235/494 |
| 6,663,008 B1 * | 12/2003 | Pettersson et al. ............ 235/494 |
| 6,667,695 B2 * | 12/2003 | Pettersson et al. ............... 341/5 |
| 6,674,427 B1 * | 1/2004 | Pettersson et al. ............ 345/179 |
| 6,689,966 B2 * | 2/2004 | Wiebe ..................... 178/18.01 |
| 2001/0051965 A1 | 12/2001 | Guillevic et al. |
| 2002/0155357 A1 | 10/2002 | LaCour |
| 2002/0163511 A1 * | 11/2002 | Sekendur .................... 345/179 |
| 2002/0182523 A1 | 12/2002 | Frankowsky |
| 2004/0005089 A1 | 1/2004 | Robles et al. |
| 2004/0035935 A1 * | 2/2004 | Takahashi et al. ....... 235/462.09 |
| 2004/0248016 A1 | 12/2004 | Lucas et al. |

* cited by examiner

$$o = \theta + \begin{cases} 0 & -\text{no } a \\ \dfrac{\pi}{2} & -\text{no } b \\ \pi & -\text{no } c \\ \dfrac{3\pi}{2} & -\text{no } d \end{cases}$$

DOCUMENT PORTION IDENTIFICATION BY FAST IMAGE MAPPING

This application is a Continuation of application Ser. No. 10/752,086, filed on Jan. 7, 2004 now U.S. Pat. No. 7,463,774, the entire contents of which are hereby incorporated by reference and for which priority is claimed under 35 U.S.C. §120.

FIELD OF THE INVENTION

The present invention relates to determining which portion of a document corresponds to a captured image of that portion. Various aspects of the present invention are particularly applicable to identifying the location of marks on a document by capturing images of the document.

BACKGROUND OF THE INVENTION

While electronic documents stored on computers provide a number of advantages over written documents, many users continue to perform some tasks with printed versions of electronic documents. These tasks include, for example, reading and annotating the documents. With annotations, the paper version of the document assumes particular significance because the annotations typically are written directly onto the printed document by the user. One of the problems, however, with directly annotating a printed version of a document is the difficulty in later converting the annotations into electronic form. Ideally, electronically stored annotations should correspond with the electronic version of the document in the same way that the handwritten annotations correspond with the paper version of the document.

This correspondence usually requires the original or another user to wade through the annotations and personally enter them into a computer. In some cases, a user may electronically scan the annotations written on the paper document, thereby creating a new electronic document. These multiple steps make reconciliation between the printed version of a document and the electronic version of the document difficult to handle on a repeated basis. Further, scanned images frequently cannot be edited. Thus, there may be no way to separate the annotations from the original text of the document. This makes using the annotations difficult.

To address this problem, pens have been developed to capture annotations written onto printed documents with the pen. This type of pen includes a camera, which captures images of the printed document as a user writes annotations. With some examples of this type of pen, however, the pen may employ ink that is invisible to the camera. The pen may, for example, employ non-carbon ink and infrared illumination for the camera, which prevents the camera from "seeing" annotation written with the ink. With this type of pen, the pen infers the movement of the pen tip forming the annotations on the document from the images captured by the pen during the writing of the annotations. In order to associate the images with the original electronic document, however, the position of the images relative to the document must be determined. Accordingly, this type of pen often is employed with paper that includes a pattern that uniquely identifies different locations on the paper. By analyzing this pattern, the computer receiving an image can determine what portion of the paper (and thus what portion of the printed document) was captured in the image.

While the use of such patterned paper or other media allows written annotations on a paper document to be converted into electronic form and properly associated with the electronic version of the document, this technique is not always reliable. For example, a document containing text on the paper may obscure areas of the pattern. If the pen captures an image of one of these areas, then the computer may not be able to use the pattern to accurately determine the location of the document portion captured by the image. Instead, the computer must employ an alternate technique to identify the location of the document portion captured in the image. For example, the computer may perform a pixel-by pixel comparison of the captured image with the electronic document.

A pixel-by-pixel comparison will usually identify the portion of document in a captured image, but this technique has a high processing overhead. To perform this technique, for example, a transform of, e.g. rotation, and scale, between the captured image and the document image typically must first be estimated so that the captured image can be warped and matched with the document image pixel-by-pixel. If the transform is unknown, all possible rotations and scales must be considered. Additionally, a reference pixel in the image is selected. Every pixel in the warped image then is compared with a corresponding pixel in the electronic document such that the image reference pixel is compared to a first location in the electronic document. This comparison must then be repeated so that the reference pixel is eventually compared to each location in the electronic document. The comparison with the highest correspondence between the image pixels and the electronic document identifies the position of the reference pixel relative to the electronic document, and thus the portion of the document captured in the image. Accordingly, it would be desirable to provide a technique that allows a computer to determine the location of a portion of a document in a captured image without having to perform a pixel-by-pixel comparison of the image with the entire document.

BRIEF SUMMARY OF THE INVENTION

Advantageously, various embodiments of the invention provide an efficient technique for determining a portion of a document corresponding to a captured image. According to various embodiments of the invention, areas of a document in which the pattern is at least partially obscured are identified. A reference pixel in the image is selected, the rotation and scale of the captured image is estimated, and an offset between the pixel and the pattern is determined. A pixel-by-pixel comparison is then made of the warped image with the document such that the reference pixel is only compared with locations in the document that are both within the identified areas and have the determined offset from the pattern. The comparison with the highest correspondence between the image pixels and the electronic document then identifies the position of the reference pixel relative to the electronic document. Using this technique, comparisons of the reference pixel with other locations of the document can be avoided, thereby reducing the processing overhead required to determine the location of the portion of the document captured in an image.

BRIEF DESCRIPTION OF THE DRAWINGS

FIG. 2A illustrates an example of a pen according to various embodiments of the invention, while FIG. 2B illustrates the resolution of an image that may be obtained by various embodiments of the invention.

DETAILED DESCRIPTION OF THE INVENTION

Figure 1:
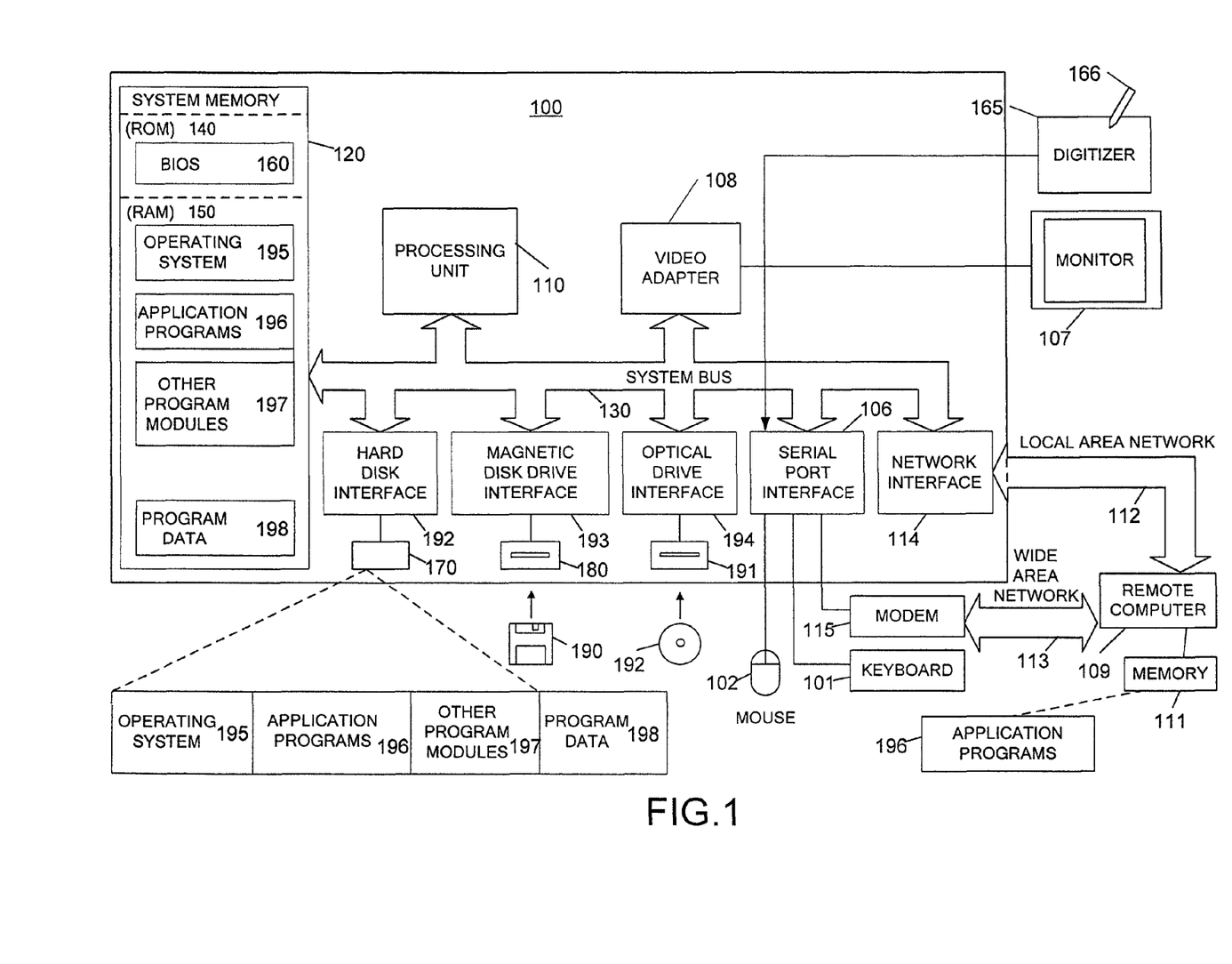
FIG. 1 shows a general description of a computer that may be used in conjunction with embodiments of the present invention.

FIG. 1 shows a functional block diagram of an example of a conventional general-purpose digital computing environment that can be used to implement various aspects of the present invention. In FIG. 1, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140 or RAM 150, including an operating system 195, one or more application programs 196, other program modules 197, and program data 198. A user can enter commands and information into the computer 100 through input devices such as a keyboard 101 and pointing device 102. Other input devices (not shown) may include a microphone, joystick, game pad, satellite dish, scanner or the like. These and other input devices are often connected to the processing unit 110 through a serial port interface 106 that is coupled to the system bus, but may be connected by other interfaces, such as a parallel port, game port or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor, personal computers typically include other peripheral output devices (not shown), such as speakers and printers. In a preferred embodiment, a pen digitizer 165 and accompanying pen or stylus 166 are provided in order to digitally capture freehand input. Although a direct connection between the pen digitizer 165 and the serial port is shown, in practice, the pen digitizer 165 may be coupled to the processing unit 110 directly, via a parallel port or other interface and the system bus 130 as known in the art. Furthermore, although the digitizer 165 is shown apart from the monitor 107, it is preferred that the usable input area of the digitizer 165 be co-extensive with the display area of the monitor 107. Further still, the digitizer 165 may be integrated in the monitor 107, or may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and typically includes many or all of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device.

It will be appreciated that the network connections shown are illustrative and other techniques for establishing a communications link between the computers can be used. The existence of any of various well-known protocols such as TCP/IP, Ethernet, FTP, HTTP, Bluetooth, IEEE 802.11x and the like is presumed, and the system can be operated in a client-server configuration to permit a user to retrieve web pages from a web-based server. Any of various conventional web browsers can be used to display and manipulate data on web pages.

Image Capturing Device

Various embodiments of the invention may be employed to determine the locations of portions of a document captured by a series of images. As noted above, the determination of the location of a portion of a document captured in an image may be used to ascertain the location of a user's interaction with paper, a display screen, or other medium displaying the document. According to some embodiments of the invention, the images may be obtained by an ink pen used to write ink on paper. With other embodiments of the invention, the pen may be a stylus used to "write" electronic ink on the surface of a digitizer displaying the document.

Figures 2A, 2B:
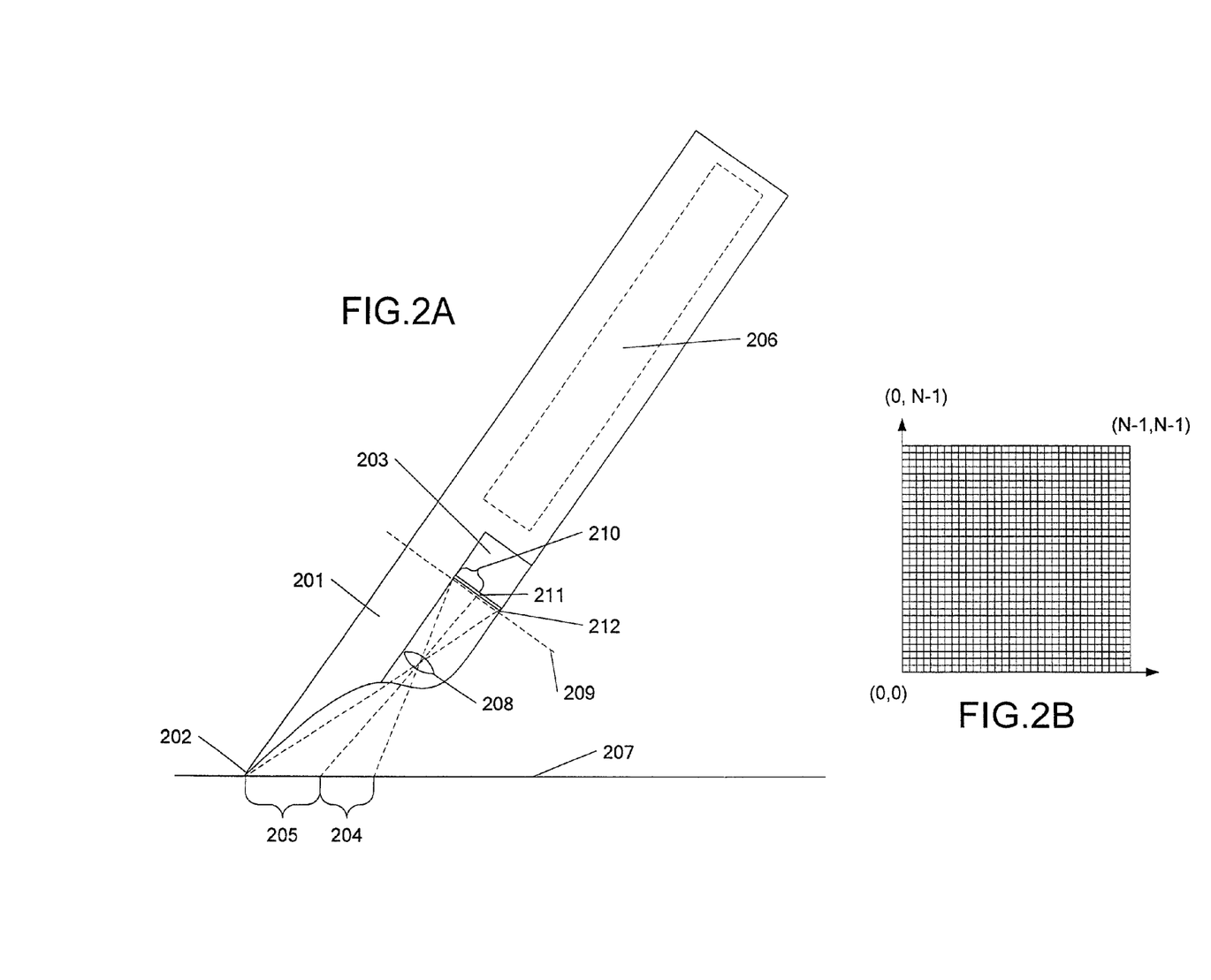

FIGS. 2A and 2B show an illustrative example of a pen 201 that may be employed according to various embodiments of the invention. The pen 201 includes a tip 202 and a camera 203. The tip 202 that may or may not include an ink reservoir. The camera 203 captures an image 204 from surface 207. The pen 201 may further include additional sensors and/or processors as represented in broken box 206. These sensors and/or processors 206 may also include the ability to transmit information to another pen 201 and/or a personal computer (for example, via Bluetooth or other wireless protocols).

FIG. 2B represents an image as viewed by the camera 203. In one illustrative example, the resolution of an image captured by the camera 203 is N×N pixels (where N=32). Accordingly, FIG. 2B shows an example image 32 pixels long by 32 pixels wide. The size of N is adjustable, where a higher value of N will provide a higher image resolution. Also, while the image captured by the camera 203 is shown as a square for illustrative purposes here, the field of view of the camera may include other shapes as is known in the art.

The images captured by camera 203 may be defined as a sequence of image frames $\{I_i\}$, where $I_i$ is captured by the pen 201 at sampling time $t_i$. The sampling rate may be large or small, depending on system configuration and performance requirement. The size of the captured image frame may be large or small, depending on system configuration and performance requirement. Also, it should be appreciated that the image captured by camera 203 may be used directly by the processing system or may undergo pre-filtering. This pre-filtering may occur in pen 201 or may occur outside of pen 201 (for example, in a personal computer).

FIG. 2A also shows the image plane 209 on which an image 210 of the pattern from location 204 is formed. Light received from the pattern on the object plane 207 is focused by lens 208. According to various embodiments of the invention, the lens 208 may be a single lens or a multi-part lens system, but is represented here as a single lens for simplicity. Image capturing sensor 211 captures the image 210.

The image sensor 211 may be large enough to capture the image 210. Alternatively, the image sensor 211 may be large enough to capture an image of the pen tip 202 at location 212. In this case, the image sensor captures an image corresponding to both locations 204 and 205. For reference, the image at location 212 will be referred to as the virtual pen tip. It should be noted that the virtual pen tip location with respect to image sensor 211 is fixed because of the constant relationship between the pen tip, the lens 208, and the image sensor 211.

As previously noted, the pen 201 will typically be used with a medium, such as a document printed on paper, the displays a pattern for identifying positions on the medium. Advantageously, this pattern may be used to transform the image 210 captured by the camera 203 into a form corresponding to the appearance of the medium. For example, the following transformation $F_{S \rightarrow P}$ transforms the image 210 captured by the camera 203 to a real image on a piece of paper:

$$L_{paper} = F_{S \rightarrow P}(L_{Sensor})$$

During writing, the pen tip and the paper are on the same plane. Accordingly, the transformation from the virtual pen tip to the real pen tip is also $F_{S \rightarrow P}$ $$L_{pentip} = F_{S \rightarrow P}(L_{virtual-pentip})$$

The transformation $F_{S \rightarrow P}$ may be estimated as an affine transformation. This simplifies as:

$$F'_{S \rightarrow P} = \begin{Bmatrix} \frac{s_x \sin\theta_y}{\cos\theta_x \sin\theta_y - \cos\theta_y \sin\theta_x}, & -\frac{s_x \cos\theta_y}{\cos\theta_x \sin\theta_y - \cos\theta_y \sin\theta_x}, & 0 \\ -\frac{s_y \sin\theta_x}{\cos\theta_x \sin\theta_y - \cos\theta_y \sin\theta_x}, & \frac{s_y \cos\theta_x}{\cos\theta_x \sin\theta_y - \cos\theta_y \sin\theta_x}, & 0 \\ 0, & 0, & 1 \end{Bmatrix}$$

as the estimation of $F_{S \rightarrow P}$, in which $\theta_x$, $\theta_y$, $s_x$ and $s_y$ are the rotation and scale of two orientations of the pattern captured at location 204. Further, one can refine $F_{S \rightarrow P}$ by matching the captured image with the corresponding real image on paper. "Refine" means to get a more precise estimation of the transformation $F_{S \rightarrow P}$ by a kind of optimization algorithm referred to as a recursive method. The recursive method treats the matrix $F'_{S \rightarrow P}$ as the initial value. The refined estimation describes the transformation between S and P more precisely.

The location of the virtual pen tip can be determined with still further precision by calibration. In order to calibrate the location of the virtual pen tip, the user places the pen tip 202 on a fixed location $L_{pentip}$ on paper. Next, the user tilts the pen, allowing the camera 203 to capture a series of images with different pen poses. For each image captured, the transformation $F_{S \rightarrow P}$ is obtained. From this transformation, one can obtain the location of the virtual pen tip $L_{virtual-pentip}$:

$$L_{virtual-pentip} = F_{S \rightarrow P}(L_{pentip})$$

where $L_{pentip}$ is initialized as (0, 0) and $$F_{S \rightarrow P} = (F_{S \rightarrow P})^{-1}$$

By averaging the $L_{virtual-pentip}$ obtained from each image, a location of the virtual pen tip $L_{virtual-pentip}$ may be determined. With $L_{virtual-pentip}$, one can get a more accurate estimation of $L_{pentip}$. After several times of iteration, an accurate location of virtual pen tip $L_{virtual-pentip}$ may be determined.

Pattern for Identifying Positions on a Medium

As previously noted, various embodiment of the invention are employed to determine the portion of a document corresponding to a captured image, where the medium displaying the document also includes a pattern for identifying different positions on the medium. Thus, the pattern may be considered to be an encoded data stream in a displayed form. The medium displaying the pattern may be printed paper (or other physical medium), or it alternately may be a display projecting the encoded data stream in conjunction with another image or set of images. For example, the encoded data stream may be represented as a physical image on the paper or an image overlying the displayed image, or it may be a physical encoded pattern (i.e., a non-modifiable pattern) combined with or overlaying a display screen (so that any image portion captured by a pen is locatable on the display screen).

Figure 3A:
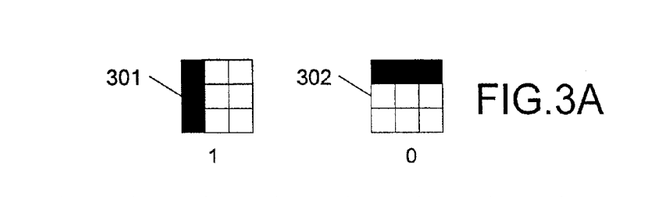
FIGS. 3A through 3I show various examples of encoding systems in accordance with embodiments of the present invention FIG. 4 graphically illustrates how an encoding pattern can be employed to determine a rotation of an image captured from a portion of a document.

FIG. 3A shows one example of encoding techniques for encoding a first bit and a second bit into a pattern for identifying positions on a medium. A first bit 301 (for example, with a value of "1") is represented by column of dark ink. A second bit 302 (with, for example, a value of "0") is represented by a row of dark ink. It should be appreciated, however, that any color ink may be used to represent the various bits. The only requirement in the color of the ink chosen is that it provides a significant contrast with the background of the medium to be differentiable by an image capturing system. In this example, the bits in FIG. 3A are represented by a 3×3 matrix of dots. The size of the matrix may be modified to be any desired size, based upon the size and resolution of the image capture system being used to capture images of the medium.

Figure 3B:
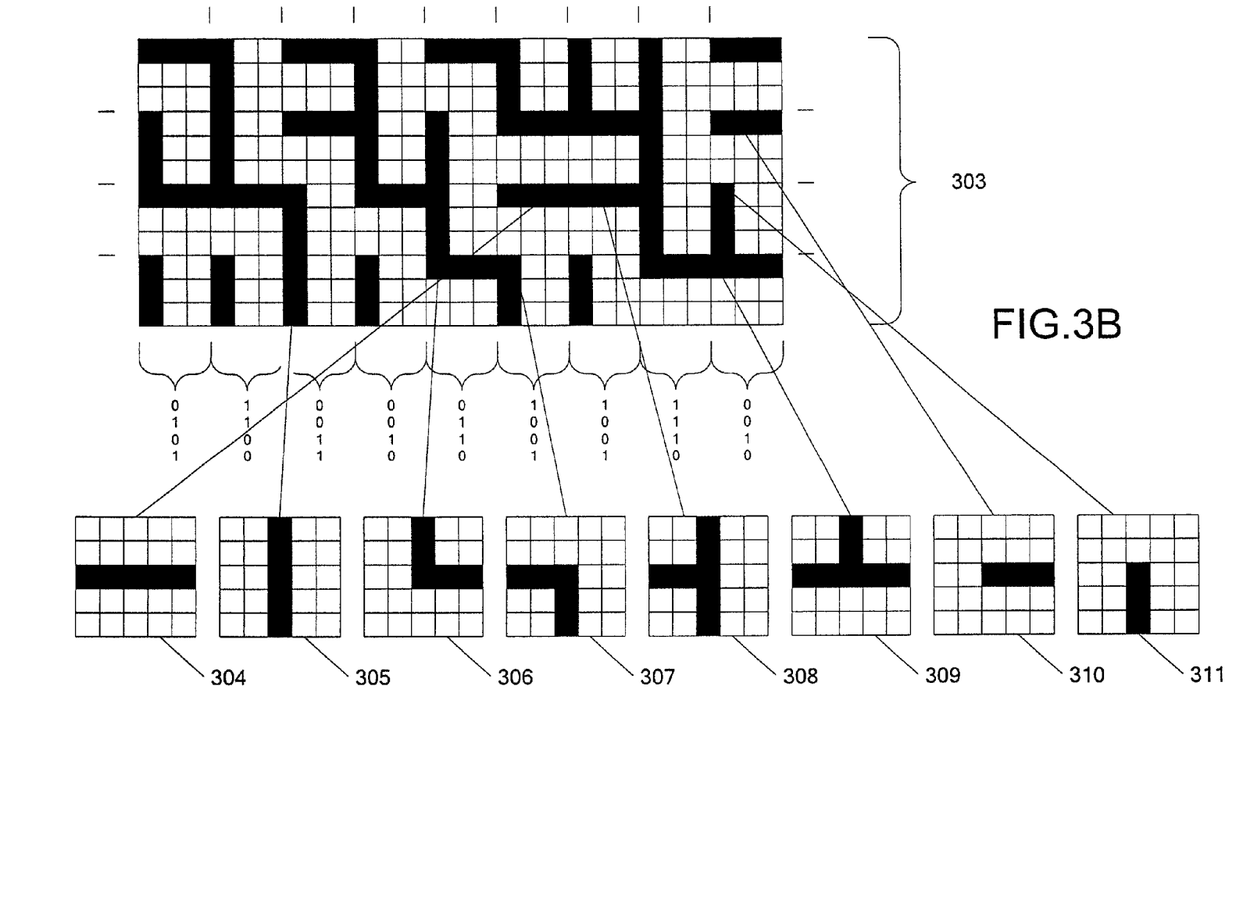
Figure 3C:
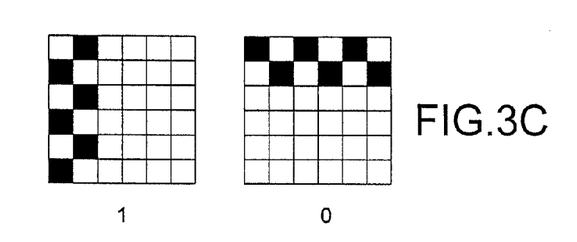
Figure 3D:
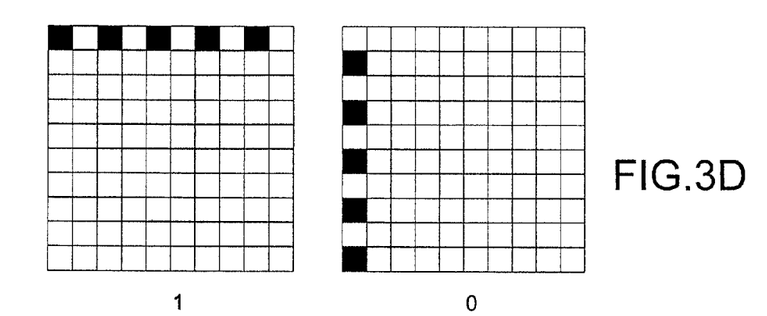
Figure 3E:
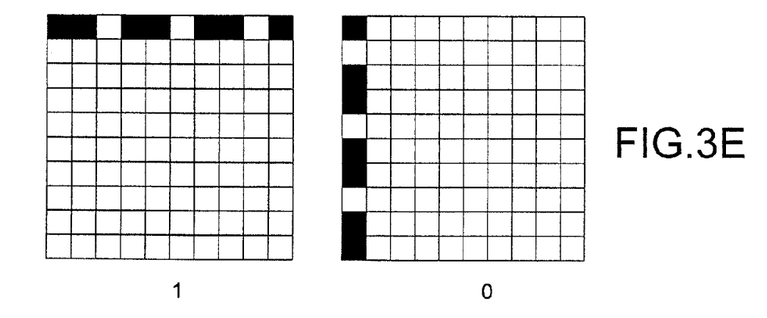

Alternative representations of bits with 0 and 1 values are shown in FIGS. 3C-3E. It should be appreciated that the representation of a one or a zero for the sample encodings of FIGS. 3A-3E may be switched without effect. FIG. 3C shows bit representations occupying two rows or columns in an interleaved arrangement. FIG. 3D shows an alternative arrangement of the pixels in rows and columns in a dashed form. Finally FIG. 3E show pixel representations in columns and rows in an irregular spacing format (e.g., two dark dots followed by a blank dot).

It should be noted that alternative grid alignments are possible, including a rotation of the underlying grid to a non-horizontal and non-vertical arrangement (for example, where the correct orientation of the pattern is 45 degrees). Using a non-horizontal and vertical arrangement may provide the probable benefit of eliminating visual distractions from the user, as users may tend to notice horizontal and vertical patterns before others. For purposes of simplicity, however, the orientation of the grid (horizontal, vertical and any other desired rotation of the underlying grid) is referred to collectively as the predefined grid orientation.

Referring back to FIG. 3A, if a bit is represented by a 3 by 3 matrix of elements and an imaging system detects a dark row and two white rows in a 3×3 region, then that region is detected a value of zero (or alternately a value of one). If a 3×3 region is detected with dark column and two white columns, then that region is detected a value of one (or, alternately, a value of zero). Accordingly, if the size of the image 210 in FIG. 2B is 32×32 pixels and each encoding unit size is 3×3 pixels, then the number of captured encoded units should be approximately 100 units. If the encoding unit size is 5×5, then the number of captured encoded units should be approximately 36.

As shown in FIG. 3A, more than one pixel or dot may be used to represent a bit. Using a single pixel (or dot) to represent a bit is fragile. Dust, creases in paper, non-planar surfaces, and the like create difficulties in reading single-element representations of data units. Even with the use of multiple elements to represent bits, however, other text displayed on the medium with the pattern, such as typewritten text in a document, may still obscure one or more bits in the pattern.

A bit stream is used to create the graphical pattern 303 of FIG. 3B. Graphical pattern 303 includes 12 rows and 27 columns. More particularly, the rows and columns are formed by a bit stream being converted into the graphical pattern 303 using bit representations 301 and 302. Thus, the pattern 303 of FIG. 3B may be viewed as having the following bit representation:

$$\begin{bmatrix} 0 & 1 & 0 & 0 & 0 & 1 & 1 & 1 & 0 \\ 1 & 1 & 0 & 0 & 1 & 0 & 0 & 1 & 0 \\ 0 & 0 & 1 & 1 & 1 & 0 & 0 & 1 & 1 \\ 1 & 0 & 1 & 0 & 0 & 1 & 1 & 0 & 0 \end{bmatrix}$$

Various bit streams may be used to create the image 303 shown in FIG. 3B. For example, a random or pseudo-random sequence of ones and zeros may be used. The bit sequence may be arranged in rows, in columns, diagonally, or following any other formulaic ordering. For example, the above matrix may be formed by the following bit stream if run left to right then down:

0100 0111 0110 0100 1000 1110 0111 0100 1100.

The above matrix may be formed by the following bit stream if run top to bottom then right:
0101 1100 0011 0010 0110 1001 1001 1110 0010.

The above matrix may represent the following bit stream if run diagonally then wrapped:
0110 0000 0101 0101 1000 0011 1111 1010 1010.

FIG. 3B also includes enlargements of pixel blocks from image 303. The enlargements 304-311 show 5×5 pixel blocks. Pixel block 304 shows a dark row between white rows. Pixel block 305 shows a dark column between white columns. Pixel block 306 shows a bottom left corner. Pixel block 307 shows a top right corner. The pixel block 308 shows a dark column with half a dark row on the left. Pixel block 309 shows a dark row with half a dark column above the row. The pixel block 310 shows half a dark row. Pixel block 311 shows half a dark column. Analyzing the combination of pixel blocks, it should be appreciated that all combinations of pixels may be formed by the image segments found in pixel blocks 304-311. The type of pattern shown in FIG. 3B may be referred to as a "maze" pattern, as the line segments appear to form a maze with no area being completely enclosed on all four sides by the maze.

Figure 3F:
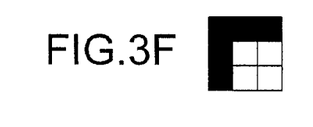
Figure 3G:
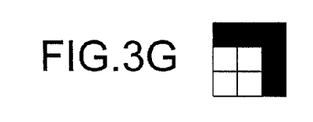
Figure 3H:
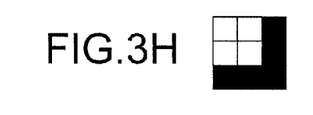
Figure 3I:
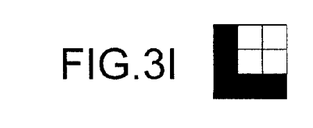

Without more, it would be expected that each of the four "corner" combinations of pixels shown in FIGS. 3F-3I would be found in the maze pattern shown in the image 303. However, as seen in FIG. 3B, only three types of corners actually exist in the eight pixel blocks 304-311. In this example, there is no corner combination of pixels as shown in FIG. 3F. By choosing the image segments 301 and 302 to eliminate a type of corner in this manner, the orientation of a captured image based on the missing type of corner can be determined.

Figure 4:
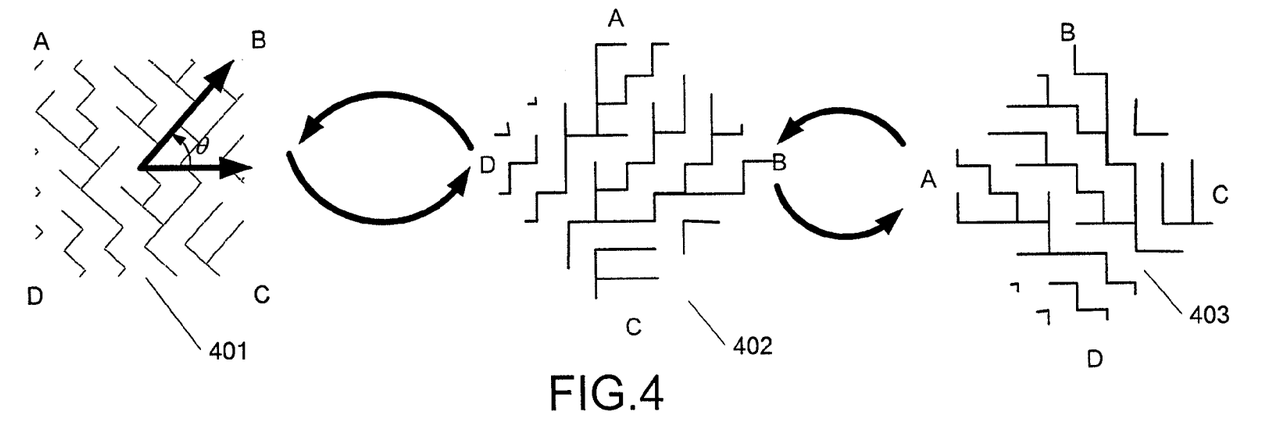

For example, as shown in FIG. 4, the image 401 as captured by a camera 203 may be analyzed and its orientation determined so as to be interpretable as to the position actually represented by the image 401. First, image 401 is reviewed to determine which pixels of the image 401 form the maze pattern, and the angle θ needed to rotate the image so that the pixels of the pattern are horizontally and vertically aligned. It should be noted that, as discussed above, alternative grid alignments are possible with different embodiments of the invention, including a rotation of the underlying grid to a non-horizontal and non-vertical arrangement (for example, where the correct orientation of the pattern is 45 degrees).

Figure 5:
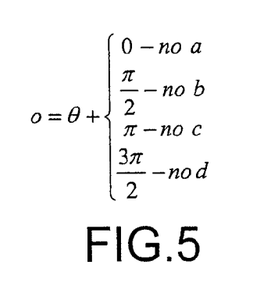
FIG. 5 illustrates a formula that may be used to determine a rotation of an image captured from a portion of a document.

Next, image 401 is analyzed to determine which corner is missing. The rotation amount o needed to rotate image 401 to an image ready for decoding 403 is shown as o=(θ plus a rotation amount {defined by which corner missing}). The rotation amount is shown by the equation in FIG. 5. Referring back to FIG. 4, angle θ is first determined by the layout of the pixels to arrive at a horizontal and vertical (or other predefined grid orientation) arrangement of the pixels and the image is rotated as shown in 402. An analysis is then conducted to determine the missing corner and the image 402 rotated to the image 403 to set up the image for decoding. Here, the image is rotated 90 degrees counterclockwise so that image 403 has the correct orientation and can be used for decoding.

It should be appreciated that the rotation angle θ may be applied before or after rotation of the image 401 to account for the missing corner. It should also be appreciated that considering noise in the captured image, all four types of corners may be present. Accordingly, with various embodiments of the invention, the number of corners of each type may be counted, and the type that has the least number of corners may be determined to be the corner type that is missing.

Finally, the code in image 403 is read out and correlated with the original bit stream used to create image 303. The correlation may be performed in a number of ways. For example, it may be performed by a recursive approach in which a recovered bit stream is compared against all other bit stream fragments within the original bit stream. Second, a statistical analysis may be performed between the recovered bit stream and the original bit stream, for example, by using a hamming distance between the two bit streams. It is appreciated that a variety of approaches may be used to determine the location of the recovered bit stream within the original bit stream.

From the foregoing, it will be appreciated that the maze pattern described above may be used to encode information onto the surface of a medium, such as a piece of paper or a display of a digitizer. This information can then be captured in one or more images by the camera 203 of the pen 201, and decoded. One particularly useful type of information that may be encoded onto the surface of a medium is position information. If portions of the bit stream are not repeated on the medium, then a computer 101 can determine the portion of a document that contains a particular bit stream.

If the complete portion of the pattern is captured in an image, then a computer 101 will be able to determine the portion of the document captured in the image, as described above. In some circumstances, however, a portion of the pattern may be obscured. For example, if the medium is a document containing, e.g., typewritten text, then the text may partially obscure one or more bits in the pattern. With the above example (where each bit is made up of a 3×3 matrix of pixels and the resolution of the camera 203 is 32×32 pixels), the computer 101 will very likely be able to determine the position of a document portion captured in an image if 60 or more bits can be identified from the image. If, however, only 36 to 60 bits can be identified in the image, then the computer 101 may still be able to determine the position of the document portion captured in the image. Still further, if only 35 or fewer bits can be identified from the image, then the computer 101 will not be able to determine the portion of the document captured in the image.

Localization by Fast Image Matching

As noted above, if an insufficient number of bits are identified from an image, then the computer 101 cannot determine which portion of the document was captured in the image. Instead, the computer 101 must employ an alternate technique to determine which portion of the document was captured in the image. The transform (e.g. rotation, scale, etc.) between the captured image and the document image should first be estimated so that the captured image can be warped to have the same rotation and scale as that of the electronic document image. If the transform is unknown, all possible rotations and scales should be considered. Consequently, if the document is stored in an electronic form, then the computer 101 can perform a pixel-by-pixel comparison of every pixel in the warped image with every location of the electronic document. This technique may require a great number of comparison processes, however. For example, one page of an electronic document may contain 1410×2019 pixels, so 2,889,090 (1410×2019) comparisons are needed. In addition, each comparison process compares a great number of pixels. For example, a captured image may contain 1024 (32×32) pixels. This technique thus entails a great deal of processor overhead and is time-consuming.

Instead, the computer 101 may localize the image by performing a fast image match according to various embodiments of the invention. As will be discussed in more detail below, a reference pixel in the captured image is selected. Those locations (e.g., pixels) in the electronic document which cannot correspond to the reference pixel are eliminated. The computer 101 can then perform a pixel-by-pixel comparison of the image with the document such that the reference pixel is only compared with those locations in the document that have not been eliminated. In this manner, the location in the document captured by an image can be identified.

Figure 6:
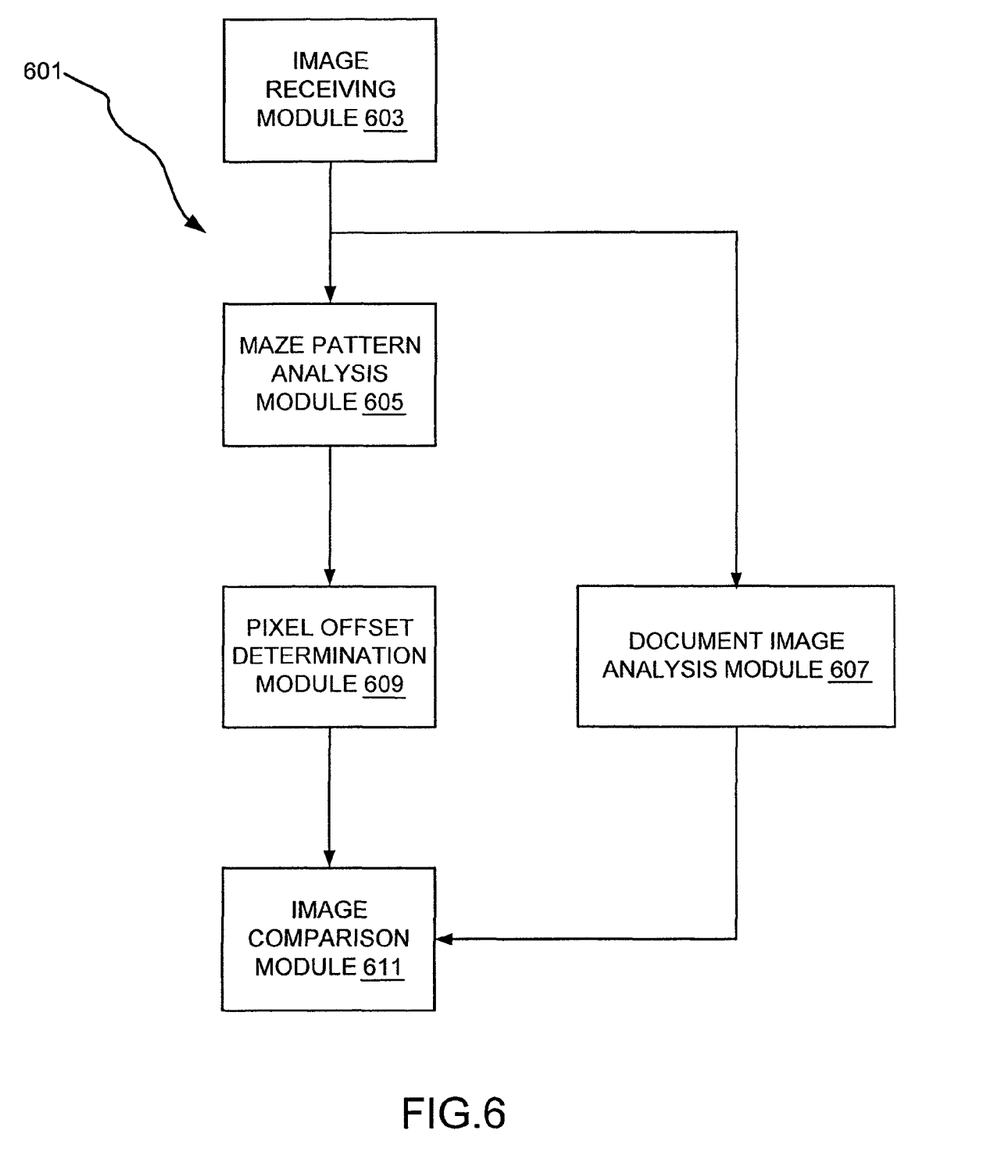
FIG. 6 illustrate a tool that may be used to match a captured image to a portion of a document according to various embodiments of the invention.

FIG. 6 illustrates a tool 601 that may be employed to perform a fast image match according to various embodiments of the invention. The tool 601 includes an image receiving module 603, a maze pattern analysis module 605, a document image analysis module 607, a pixel offset determination module 609, and an image comparison module 611. As will be discussed in more detail below, the image receiving module 603 receives an image of a portion of a document displayed on a physical medium, which includes a pattern such as the maze pattern described in detail above. The maze pattern analysis module 605 then analyzes the image to obtain the rotation and scale of a pattern in the image, such as a maze pattern described in detail above. The document image analysis module 607 then analyzes an electronic version of the document, to determine where the pattern is partially obscured by, e.g., text or drawings in the document. More particularly, with the illustrated embodiments of the invention, the document image analysis module 607 analyzes the electronic version of the document to determine the areas in which the pattern is too obscured to provide reliable position information.

The pixel offset determination module 609 then determines an offset between a reference pixel in the captured image and the pattern in the captured image, while the image comparison module 611 compares the warped image (warped by the rotation and scale information obtained from the maze pattern analysis module 605) with an electronic version of the document. More particularly, the image comparison module 611 makes a pixel-by-pixel comparison of the warped image with the electronic version of the document based upon document locations that are in the identified obscured areas and that have the determined offset. With the illustrated embodiments, one or more of the modules 603-611 may be implemented by instructions executed on a computer, such as the computer 101. With still other embodiments of the invention, however, one or more of the modules 603-611 may be implemented using hardware components.

Figure 7A:
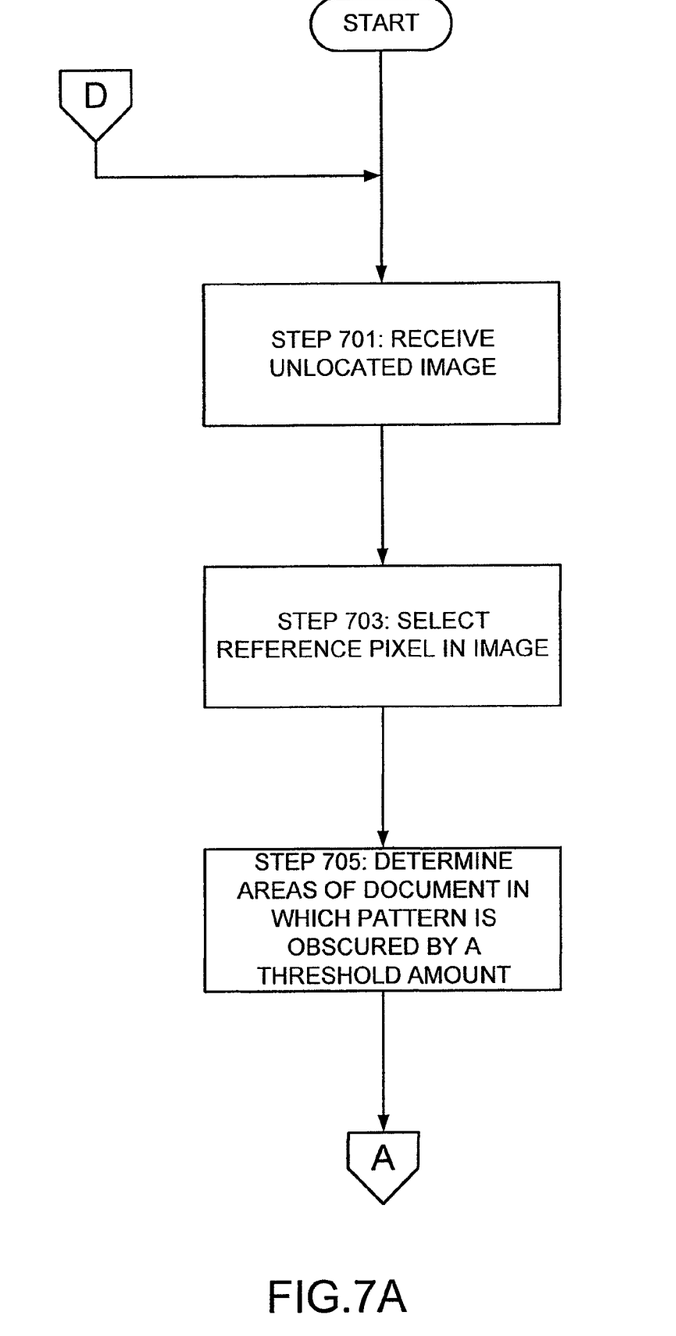
FIGS. 7A-7C illustrate a flowchart describing a method for matching a captured image to a portion of a document according to various embodiments of the invention.
Figure 7B:
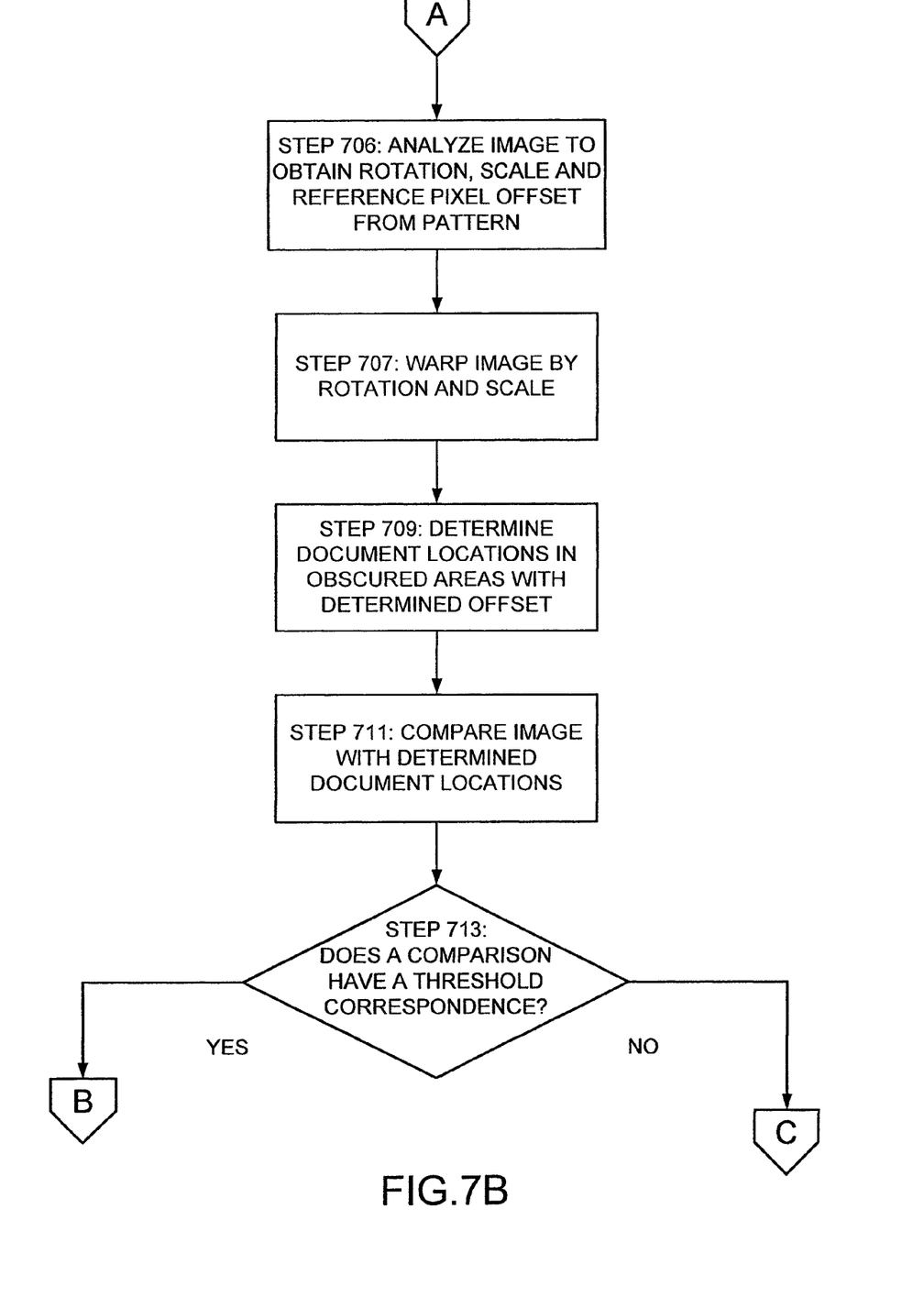
Figure 7C:
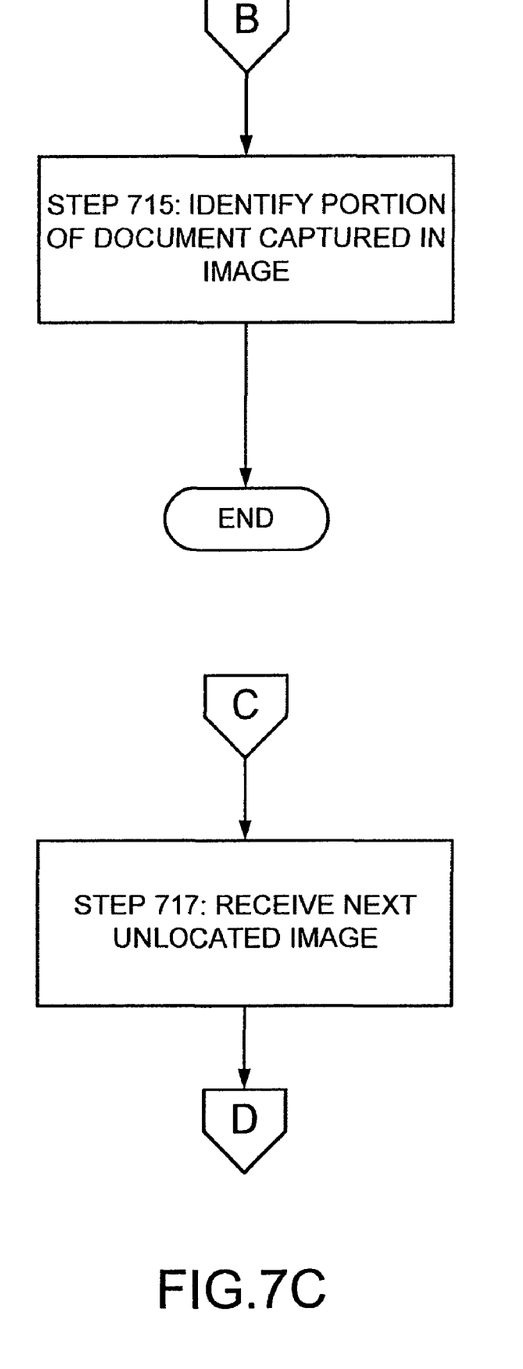

FIGS. 7A-7C illustrate a method of fast image matching that may be employed according to various examples of the invention using, e.g., a tool such as the tool 601. In step 701, the image receiving module 603 receives an image of a portion of a document displayed on a physical medium. The medium may be, for example, a piece of paper, a digitizing display that can both display the document and receive input from the pen 201, or any other type of physical medium. With the illustrated embodiments, the received image is an image that is unlocated, and cannot otherwise be associated with a particular portion of the document using other techniques.

Next, in step 703, a reference pixel is selected for the image. With various embodiments of the invention, the reference pixel may be a center pixel in the image. As will become apparent from the following description, using a central pixel as the reference pixel may make some calculations associated with the process easier to determine. With other embodiments of the invention, however, the reference pixel may be any desired pixel. For example, the reference pixel may alternately be the upper leftmost pixel in the image, the lower leftmost pixel in the image, the upper rightmost pixel in the image, or the lower rightmost pixel in the image.

Next, the document image analysis module 607 analyzes the electronic version of the document, to determine areas in the document in which the pattern is partially obscured (hereafter referred to as "obscured areas" for convenience). According to various embodiments of the invention, the document image analysis module 607 specifically identifies obscured areas in the document in which the pattern is obscured by a threshold amount. More particularly, the document image analysis module 607 identifies those areas in the document in which so much of the pattern is obscured that the computer 101 would be unable to determine the position information in those areas.

As explained in detail above, various examples of the invention employ a pattern where each bit in the pattern is made up of a 3×3 matrix of pixels. Further, with some embodiments of the invention, the resolution of the camera 203 used to capture the image of a portion of a patterned document may be 32×32 pixels. With this arrangement, a computer 101 analyzing the image will be able to determine the position of the portion of the document captured in the image if 60 or more bits can be identified from the image. If, however, only 59 bits or less can be identified in the image, then the computer 101 may not be able to determine the position of the document portion captured in the image. Accordingly, if an image of a document portion cannot be identified with this arrangement, then the image must be of a 32×32 pixel area in the document where all but 59 or fewer of the pattern bits are obscured. By identifying those 32×32 pixels areas in a document with 59 or fewer unobscured bits, the document image analysis module 607 can eliminate other areas in the document (i.e., areas in which 60 or more bits are displayed) as the source of the image.

It should be noted that the document image analysis module 607 will identify the obscured areas of the document relative to the reference pixel selected in step 703. For example, if the center pixel is selected as the reference pixel, then the obscured areas will be made up of pixels where the surrounding 32×32 array of pixels have 59 or fewer unobscured bits. Similarly, if the reference pixel is the upper rightmost pixel in the image, the obscured areas will be made up of document pixels where the 32×32 array of pixels below and to the left of the document pixels have 59 or fewer unobscured bits. On the other hand, if the reference pixel is the lower rightmost pixel in the image, then the obscured areas will be made up of document pixels where the 32×32 matrix of pixels above and to the left have 59 or fewer unobscured bits.

In step 706, the maze pattern analysis module 605 determines the rotation and scale of the received image relative to the document and the pixel offset determination module 609 determines the offset of the reference pixel from the pattern. In step 707, the received image is warped using the rotation and scale information. For example, as explained in detail above, a user may both angle and rotate the pen 201 containing the camera 203, causing the resulting image to be irregularly-shaped relative to the actual document. Accordingly, the correct position of each pixel of the captured image must be translated into the coordinate values used to specify individual locations in the document. If, for example, the image has 32×32 pixels, then the warp process will calculate the relative position coordinates of all 1024 pixels according to the document coordinate system. The warping operation thus is an affine transform, and is performed using a transformation matrix. This will involve rotation and change of scale of the image.

The image is warped by the scale and rotation determined from the maze pattern analysis of the image, as described in detail above. As previously noted, the pattern is made up of lines that are orthogonal to each other and spaced apart at a regular distance. Accordingly, by identifying the pattern in the image, the maze pattern analysis module 605 can determine the angular difference between the image pattern and the document pattern along the x and y dimensions. The maze pattern analysis module 605 can also determine the difference between the spacing of the image pattern and the spacing of the document pattern. Based upon these differences, the maze pattern analysis module 605 can determine the transform to warp the image so that it corresponds to the coordinate system of the document.

Figure 8:
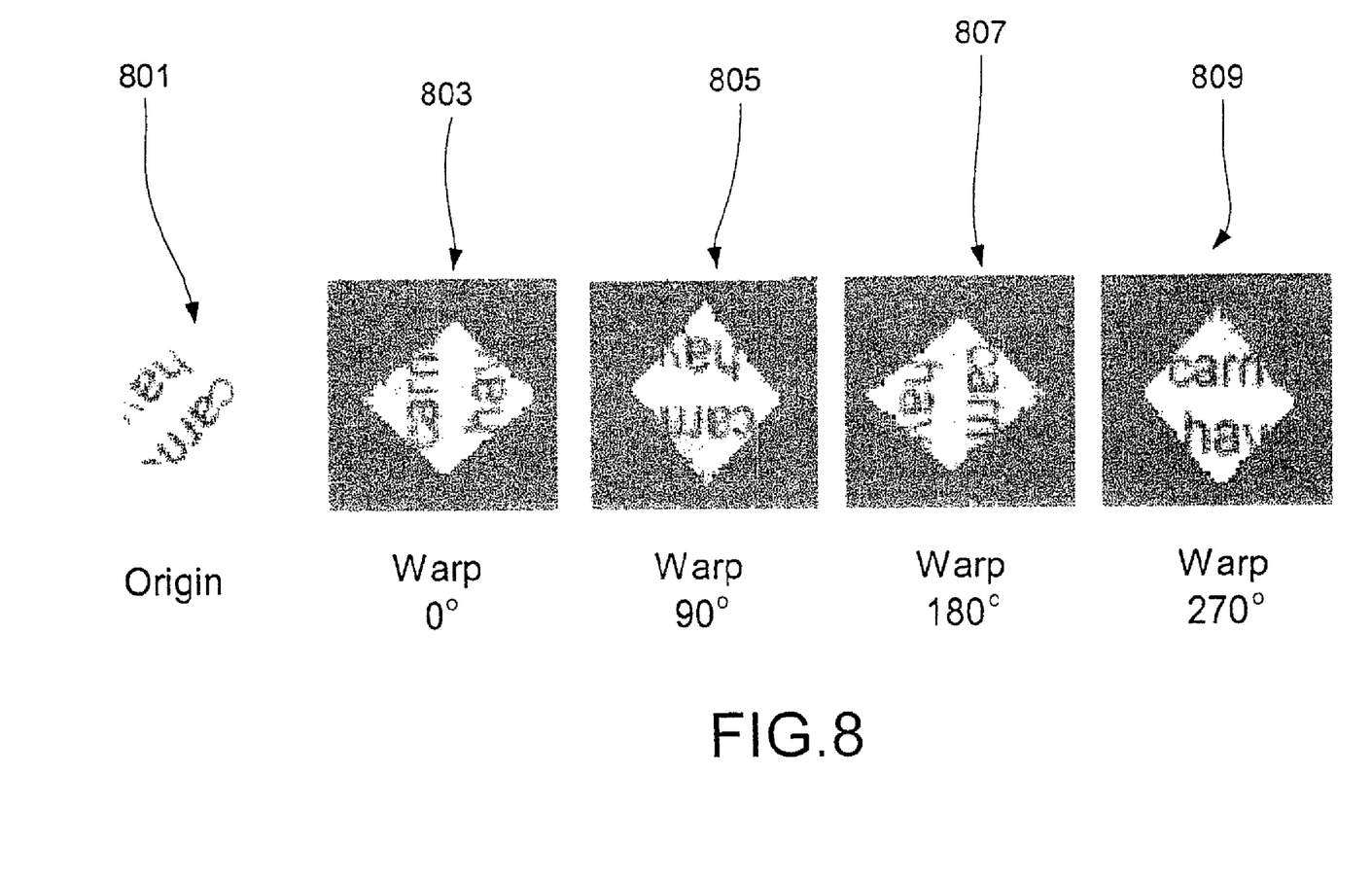
FIG. 8 illustrates an example of how a captured image is warped and then rotated at multiples of 90°.

As also previously noted, distinct features of the pattern, such as types of corner shapes, can be used to identify the absolute angular orientation of the image relative to the document. If occurrences (or absences) of these distinct features are obscured in the image, however, then the maze pattern analysis module 605 may be unable to determine the absolute angular orientation of the image relative to the document. In this circumstance, the pixel offset determination module 609 will repeat the warp process four times at 90o intervals, to ensure that the warp with the best orientation to the document coordinates is identified. For example, an initial image 801 is shown in FIG. 8. This figure also shows the first warp 803 of the image without additional rotation (i.e., at a warp rotation of 0°), and a second warp 805 of the image with an additional rotation of 90° (i.e., at a warp rotation of 90°). FIG. 8 also shows a third warp 807 of the image with an additional rotation of 180° (i.e., at a warp rotation of 180°), and a fourth warp 809 of the image with an additional rotation of 270° (i.e., at a warp rotation of 270°). As will be discussed in more detail below, each of the rotations of the warped image will be compared to the document.

Next, the pixel offset determination module 609 determines the distance from the reference pixel to the closest cell of the pattern. Moreover, this distance is calculated in both the x-direction and the y-direction (if locations in the document are identified using a Cartesian coordinate system, as with the illustrated examples). If the offset of maze pattern in the original image is defined as (dx, dy), and the warp matrix is M, then the offset of the reference pixel from the pattern in the warped image (referred to as $(dx_1, dy_1)$) can be calculated as $$(dx_1, dy_1)^T = M(dx, dy)^T$$

where T is the "transpose" operator on the matrix

Once the offset is determined relative to the coordinate system for the electronic version of the document, in step 709 the pixel offset determination module 609 examines each location in the document to determine if that location shares the same offset as the reference pixel. More particularly, each location (x,y) in previously identified obscured areas of the document are examined to see if that location shares the same offset as the reference pixel. If the offset of a location in an obscured area to the closest pattern cell (in both the x-direction and the y-direction) matches the offset of the reference pixel by a threshold amount, such as 0.7 pixels, then that location is considered to be a possible match to the reference pixel in the image. Thus, a document location x,y will be considered a possible match to the reference pixel in the image if:

CellDistance$(x+dx_1, h) < 0.7$; and

CellDistance$(y+dy_1, h) < 0.7$ where h is the size of a maze pattern cell, CellDistance is defined as $$CellDisance(a, b) = \begin{cases} mod(a, b), & \text{if } mod(a, b) < b/2 \\ b - mod(a, b), & \text{if } mod(a, b) > b/2 \end{cases}$$

where mod(a, b) means a mod b.

It should be noted that the threshold value 0.7 is selected to take into account possible raster errors and other calculation errors that may have occurred in warping the image. Other threshold values may alternately be employed as desired. The locations in the document having an offset sufficiently matching the offset of the reference pixel will be referred to as "matching locations" for convenience.

In step 711, the image comparison module 611 compares the image with the document based upon the matching locations (i.e., the locations in the obscured areas that match the offset of the reference pixel of the image). More particularly, the warped image is compared with different portions of the document such that the reference pixel in the warped image is compared with each matching location in the document (and is only compared to matching locations in the document). As previously noted, this comparison process is repeated for each warp rotation of the image. A comparison between a warped image and a portion of the document may be, for example, to determine the correlation between the grayscale values of the document portion and the grayscale values of the warped image. Of course, any suitable technique for comparing the warped image with document portions may be employed.

If a comparison of the warped image with a document portion meets one or more desired threshold requirements, then the image comparison module 611 will determine that the captured image is an image of the document portion. For example, as noted above, each comparison of the warped image with a document portion produces a correlation result. With various embodiments of the invention, the image comparison module 611 will identify those comparisons that produce a correlation of, e.g. 0.5 (50%) or better. The image comparison module 611 will then identify a first comparison with the highest correlation and a second comparison with the second highest correlation. If the correlation value of the first comparison is 0.1 higher (i.e., 10% higher) than the correlation value of the second comparison, the image comparison module 611 will determine in step 717 that the image portion used in the first comparison is the document portion captured in the image.

If none of the comparison correlation values meets the threshold amount (e.g., 0.5), then the image will not be matched to a particular portion of the document. Similarly, if none of the comparison correlation values is sufficiently higher than the other comparison correlation values, then the image will not be matched to a particular portion of the document. If the image cannot be matched to a particular document portion, then in step 719 another unlocated image is received by the image receiving module 603 and the above technique is repeated.

CONCLUSION

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

What is claimed is:

1. A method of determining a portion of a document corresponding to a captured image, the method comprising:
   employing a processor that executes instructions retained in a computer-readable medium, the instructions when executed by the processor implement at least the following operations:
   receiving a captured image with an image capturing device of a portion of a document stored in electronic form, wherein the document has a pattern that uniquely identifies different positions in the document and wherein the captured image contains a portion of the pattern, and the portion of the pattern is at least partially obscured by overlaid printed content of the electronically stored document;
   determining obscured areas of the document in which the pattern is at least partially obscured;
   comparing the captured image with determined obscured areas of the electronically stored document;
   identifying the position of the portion of the document corresponding to the captured image;
   determining a spatial relationship between a reference pixel in the captured image and the pattern within the captured image, the determined spatial relationship is a shortest distance measured by a pixel offset between the reference pixel and an unobscured portion of the pattern; and
   identifying locations in the obscured areas of the document exhibiting a similar spatial relationship to the pattern in the obscured areas.

2. The method according to claim 1 further comprising:
   comparing the captured image with portions of the obscured areas of the document associated with the identified locations.

3. The method according to claim 2, further comprising:
   warping the captured image so that the scale and orientation of the captured image matches the scale and orientation of the document.

4. The method according to claim 3, further comprising:
   repeating a comparison of the captured image with a particular portion of the document for each 90" rotation of the captured image.

5. The method according to claim 2, further comprising:
   identifying the position of the portion of the document corresponding to the captured image based on the comparisons which produce a correlation of 50% or greater.

6. The method according to claim 2, further comprising:
   identifying the position of the captured image to be the portion of the document corresponding to the comparisons which produce a correlation at least 10% higher than all other comparison correlation values.

7. The method according to claim 1, wherein determining obscured areas of the document comprises determining, for a given pixel of the document, whether the amount of the pattern that is obscured in a portion of the document around the given pixel is more than a predetermined amount.

8. The method according to claim 7, wherein the portion of the document around a given pixel is the same size as the captured image.

9. The method according to claim 7, wherein the predetermined amount represents an amount of obscuring of the pattern such that the pattern in that portion of the document does not uniquely identify the position of the portion within the document.

10. The method according to claim 1, wherein the pattern is randomly or pseudorandomly generated.

11. One or more computer-readable storage media storing computer-executable instructions that, when executed, causes one or more processors to perform operations comprising:

receiving a captured image of a portion of a document, the document having a pattern that uniquely identifies different positions in the document and the captured image containing a portion of the pattern that uniquely identifies different positions in the document, and the portion of the pattern being at least partially obscured by overlaid printed content of the electronically stored document;

determining obscured areas of the document in which the pattern is at least partially obscured;

comparing the captured image with determined obscured areas of the document;

identifying the position of the portion of the document corresponding to the captured image;

determining a spatial relationship between a reference pixel in the captured image and the pattern within the captured image, the determined spatial relationship is a shortest distance measured by a pixel offset between the reference pixel and an unobscured portion of the pattern; and identifying locations in the obscured areas of the document exhibiting a similar spatial relationship to the pattern in the obscured areas.

12. The one or more computer-readable storage media according to claim 11 the program further comprising:

comparing the captured image with portions of the obscured areas of the document associated with the identified locations.

13. The one or more computer-readable storage media according to claim 12, the program further comprising:

warping the captured image so that the scale and orientation of the captured image matches the scale and orientation of the document.

14. The one or more computer-readable storage media according to claim 13, the program further comprising:

repeating a comparison of the captured image with a particular portion of the document for each 90" rotation of the captured image.

15. The one or more computer-readable storage media according to claim 12, the program further comprising:

identifying the position of the portion of the document corresponding to the captured image based on the comparisons which produce a correlation of 50% or greater.

16. The one or more computer-readable storage media according to claim 12, the program further comprising:

identifying the position of the captured image to be the portion of the document corresponding to the comparison which produces a correlation at least 10% higher than all other comparison correlation values.

17. The one or more computer-readable storage media according to claim 11, wherein determining obscured areas of the document comprises determining, for a given pixel of the document, whether the amount of the pattern that is obscured in a portion of the document around the given pixel is more than a predetermined amount.

18. The one or more computer-readable storage media according to claim 17, wherein the portion of the document around a given pixel is the same size as the captured image.

19. The one or more computer-readable storage media according to claim 17, wherein the predetermined amount represents an amount of obscuring of the pattern such that the pattern in that portion of the document does not uniquely identify the position of the portion within the document.

20. The one or more computer-readable storage media according to claim 11, wherein the pattern is randomly or pseudorandomly generated.

* * * * *